United States Patent
Mutz et al.

(10) Patent No.: US 7,640,037 B2
(45) Date of Patent: Dec. 29, 2009

(54) SYSTEM AND METHOD FOR CAPTURING AND PROCESSING BUSINESS DATA

(75) Inventors: Andrew H. Mutz, Palo Alto, CA (US); Oleg Rashkovskiy, Cupertino, CA (US); Joseph R. S. Molnar, Palo Alto, CA (US); Chris P. Dury, Mountain View, CA (US); Andrew Laszlo, Hillsborough, CA (US); Rudy Ruano, Campbell, CA (US)

(73) Assignee: scanR, Inc., Palo Alto, CA (US)

( * ) Notice: Subject to any disclaimer, the term of this patent is extended or adjusted under 35 U.S.C. 154(b) by 955 days.

(21) Appl. No.: 11/133,049

(22) Filed: May 18, 2005

(65) Prior Publication Data

US 2006/0264236 A1    Nov. 23, 2006

(51) Int. Cl.
    *H04M 1/00* (2006.01)
(52) U.S. Cl. .............. 455/557; 455/556.1; 455/566; 455/41.2; 455/550.1; 382/157
(58) Field of Classification Search .......... 455/556.1, 455/557, 556.2, 566, 550.1, 41.2; 348/14.01–14.02; 382/181–182
    See application file for complete search history.

(56) References Cited

U.S. PATENT DOCUMENTS

| | | | | |
|---|---|---|---|---|
| 5,493,105 | A * | 2/1996 | Desai | 235/375 |
| 5,737,491 | A * | 4/1998 | Allen et al. | 704/270 |
| 5,970,418 | A * | 10/1999 | Budd et al. | 455/566 |
| 6,157,954 | A * | 12/2000 | Moon et al. | 709/228 |
| 6,192,257 | B1 * | 2/2001 | Ray | 455/566 |
| 6,243,713 | B1 * | 6/2001 | Nelson et al. | 707/104.1 |
| 6,412,689 | B1 * | 7/2002 | Horiguchi et al. | 235/375 |
| 6,687,697 | B2 * | 2/2004 | Collins-Thompson et al. | 707/6 |
| 6,970,601 | B1 * | 11/2005 | Kaneda et al. | 382/209 |
| 7,007,105 | B1 * | 2/2006 | Sullivan et al. | 709/247 |
| 7,043,048 | B1 * | 5/2006 | Ellingson | 382/100 |
| 7,092,735 | B2 * | 8/2006 | Osann, Jr. | 455/556.1 |
| 7,139,014 | B1 * | 11/2006 | Kim et al. | 348/14.01 |
| 7,450,760 | B2 * | 11/2008 | Molnar et al. | 382/181 |
| 2001/0044324 | A1 * | 11/2001 | Carayiannis et al. | 455/564 |
| 2002/0083079 | A1 * | 6/2002 | Meier et al. | 707/104.1 |
| 2002/0103908 | A1 | 8/2002 | Rouse et al. | |
| 2003/0036365 | A1 | 2/2003 | Kuroda | |
| 2003/0166400 | A1 * | 9/2003 | Lucas | 455/425 |
| 2004/0212706 | A1 * | 10/2004 | Silverbrook et al. | 348/272 |
| 2005/0085188 | A1 * | 4/2005 | Ishii et al. | 455/41.2 |
| 2005/0215278 | A1 * | 9/2005 | Liow et al. | 455/550.1 |
| 2005/0259866 | A1 * | 11/2005 | Jacobs et al. | 382/157 |

(Continued)

OTHER PUBLICATIONS

Pratt, William K., "Chapter 10: Image Enhancement", from Digital Image Processing, John Wiley & Sons, New York, (1991).

(Continued)

*Primary Examiner*—Sharad Rampuria
(74) *Attorney, Agent, or Firm*—Darby & Darby PC; John W. Branch

(57) ABSTRACT

A method of processing information received in the form of a message from a mobile handheld device with a camera, where the message includes data representing an image of a document and an identifier of a type of said document. The method preferably provides image enhancement, information recognition and analysis selected based on the identified document type. An output of the system is preferably provided to the user in the form specified by the user, such as an e-mail.

35 Claims, 8 Drawing Sheets

U.S. PATENT DOCUMENTS

2006/0280364 A1\* 12/2006 Ma et al. .................... 382/173

OTHER PUBLICATIONS

Tompkins, et al., "Lossless JBIG2 Coding Performance," Proc. Data Compression Conference, IEEE Computer Society Press, 553 (1999).

Allen, James "Natural Language Understanding," 1995, Benjamin-Cummings Publishing Companys, Inc., 36 pgs.
Aho, Alfred V., "Compilers: Principles, Techniques, and Tools," Dec. 1985, Addison-Wesley Publishing Company, pgs. 15 pgs.
Umar, Amjad "Object-Oriented Client/Server Internet Environments: the Modern IT Infrastructure," 1997, Prentice Hall PTR, New Jersey, 5 pgs.

\* cited by examiner

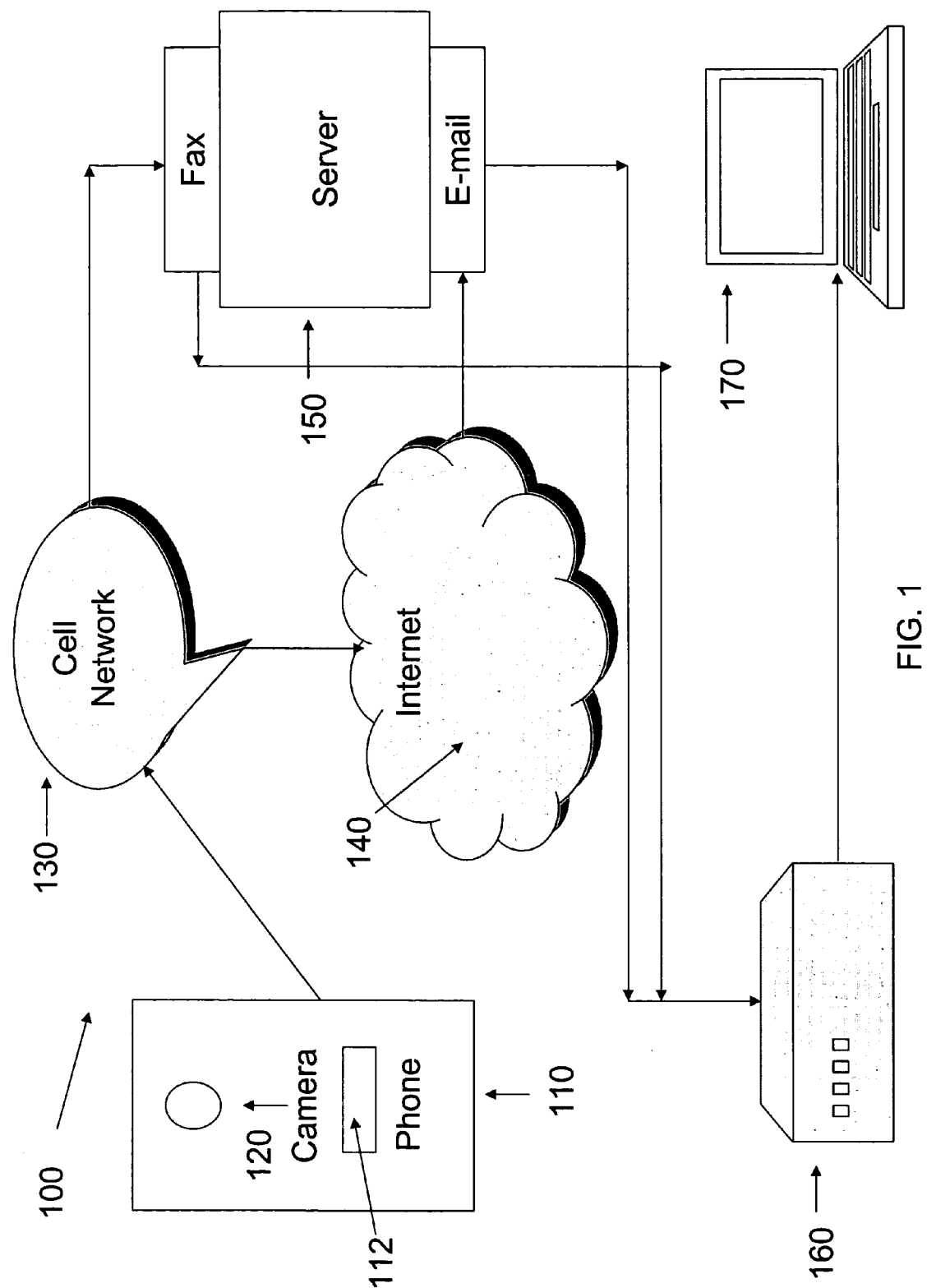

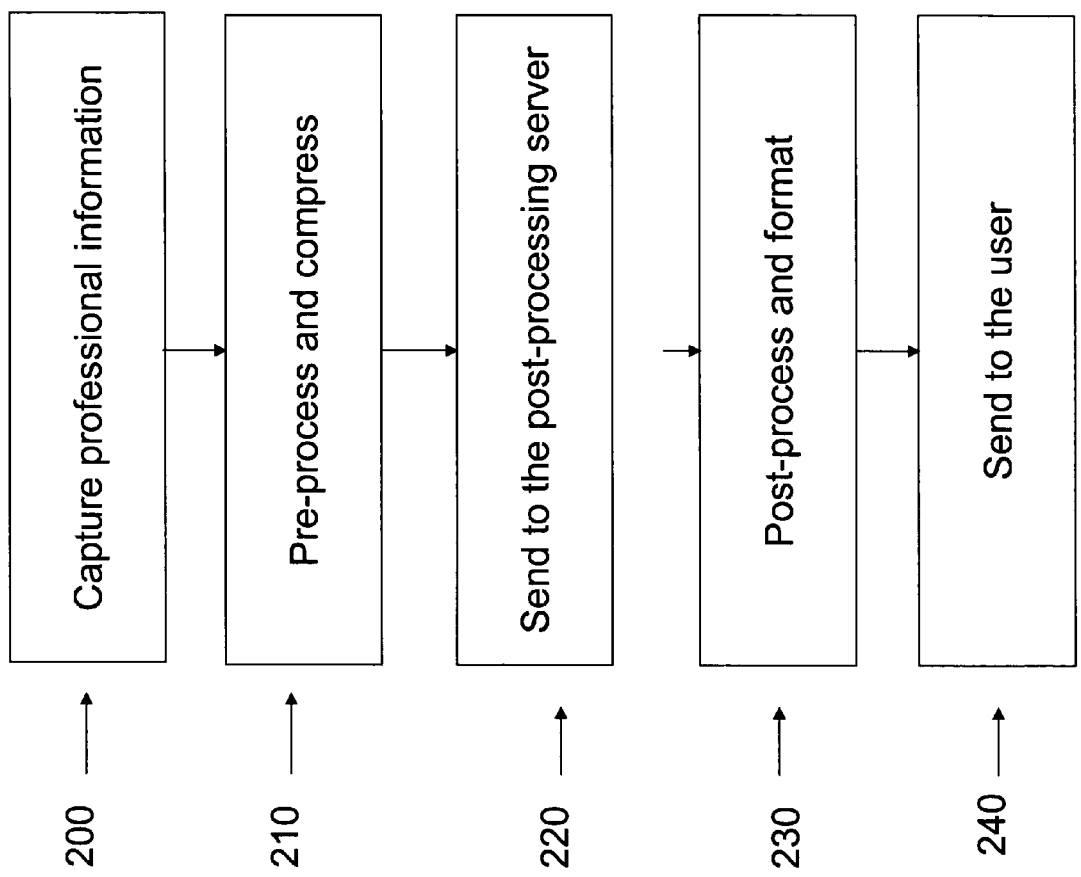

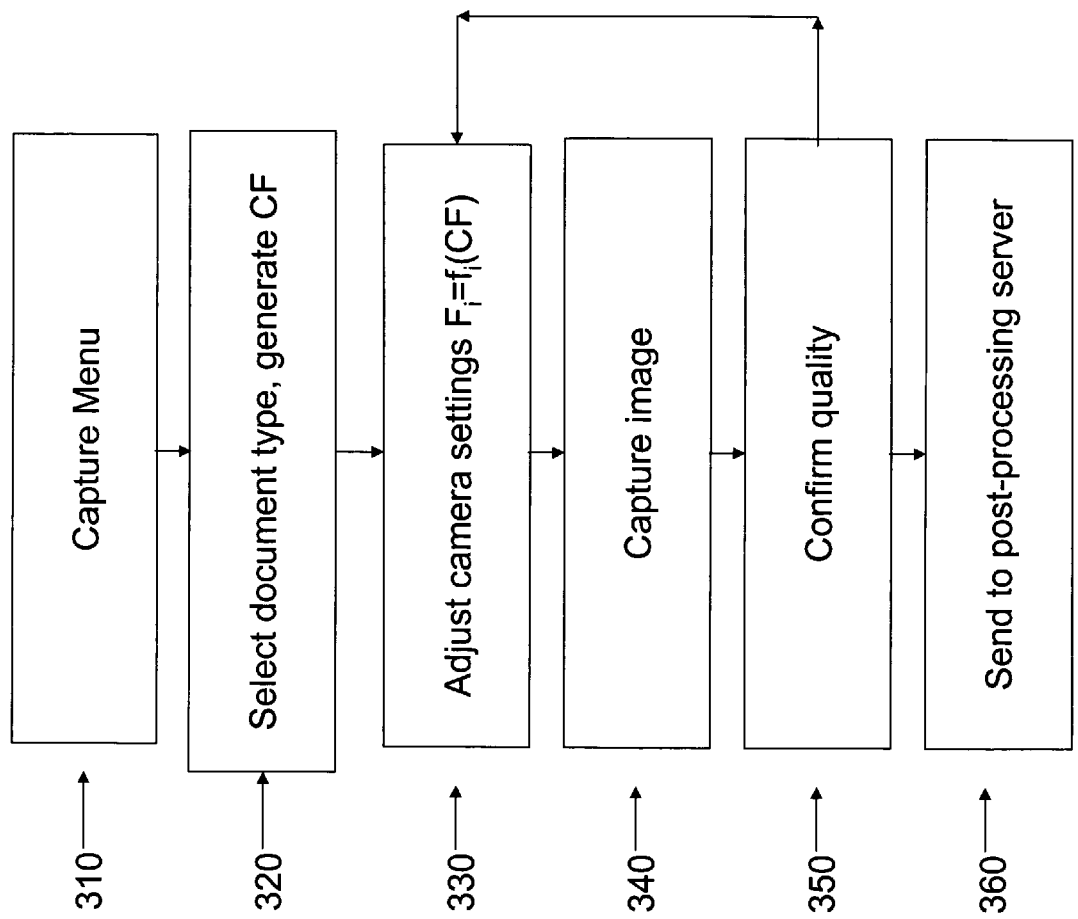

SYSTEM AND METHOD FOR CAPTURING AND PROCESSING BUSINESS DATA

BACKGROUND

Cellular (cell) telephones with built-in cameras are well known and widely used. Such phones permit taking a photograph and storing it within the phone. Then, the photograph can be transmitted to a user's e-mail mail box as an attachment using well-known technology of transmitting image data via cellular telephony. Further, it is known to include in a cell phone a relatively powerful processor and related electronics which are capable of supporting a variety of applications.

However, a cell phone—camera—email combination has not been effectively utilized for applications outside of capturing and transmitting photographs. For example, it would be desirable to capture business cards, text documents, forms, hand-written notes and other business, technical, or specialized documents and provide them to a user in a convenient format consistent with the nature of the document. For example, it would be desirable to use a cell phone to capture a business card and provide it to the user as interpreted data suitable for entry into user's computerized contact organizer. Similarly, it would be useful to capture a document and provide it to the user as recognized text, or to capture handwritten notes and provide them to the user as a text document.

Although technologies exist for storing business cards, performing optical character recognition (OCR) and handwriting recognition (ICR), such technologies have not been effectively combined with cellular imaging applications. Since professionals spend significant time away from their offices, their most readily accessible communications tool is a cellular telephone. Thus, it is valuable to adapt a cell phone with a camera to the needs of professionals and business people. For example, a professional may find it highly useful to capture a business card received at a convention using her cell phone and transfer it in an interpreted form to her e-mail account. Likewise, it would be useful to transmit notes generated at an out-of-the-office meeting to user's e-mail mail box as text immediately after the meeting.

Thus, despite the availability of many technological components, technology is still lacking for many applications for business and professional users of cell phones. Such users may need specialized processing of various types of information which is generally referred to herein as documents or professional information.

BRIEF DESCRIPTION OF THE DRAWING FIGURES

FIG. 1 is a schematic diagram illustrating a computer architecture associated with a system for capturing and processing data according to one exemplary embodiment of the present invention;

FIG. 2 is a flow chart illustrating steps of one exemplary operation of the system of FIG. 1;

FIG. 4 is a flow chart illustrating a process flow of software components, according to one exemplary embodiment, that are associated with a handheld device that is itself associated with the system of FIG. 1 and supports a service provided thereby;

DETAILED DESCRIPTION OF PREFERRED EMBODIMENTS

Figure 3A:
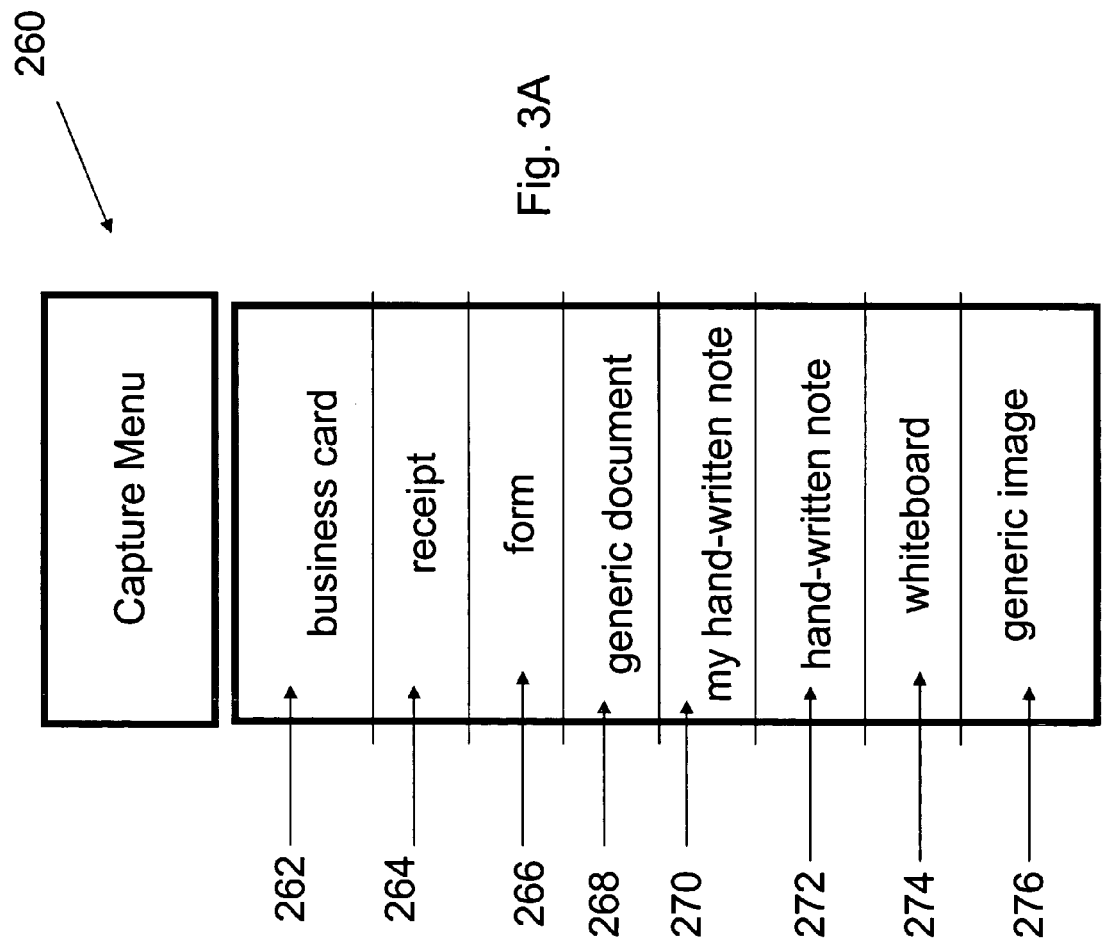
FIG. 3A is a schematic diagram of a user interface menu according to one exemplary embodiment that is accessed using a handheld device associated with the system of FIG. 1.

Referring first to FIG. 1 which is a schematic diagram illustrating a computer architecture associated with a system 100 for capturing and processing data according to one exemplary embodiment of the present invention. The system 100 and its related processing methods, as well as other related methods, can also be thought of and is referred to herein as being a service. The illustrated system 100 includes a handheld communication device 110 which according to one exemplary embodiment is a cellular phone. The cellular phone 110 includes traditional components, such as a processor or the like, as well as standard communication software, etc. The cellular phone 110 is of the type that includes a camera 120 that permits a user to capture and store an image. The camera 120 can be of any number of different types of cameras so long as the camera 120 is of the type intended for use in a cellular phone and therefore is a micro-sized camera. As a result of having the camera 120 being a part thereof, the cellular phone 110 includes additional software for processing the images that are captured using the camera 120.

In addition and as described in greater detail hereinafter, the cellular phone 110 includes software for processing preselected information (e.g., professional information) but it otherwise constructed as a typical conventional camera cellular phone. The cellular phone 110 can optionally include various other known features customarily available in such phones, including a contacts organizer and personal computing capabilities.

The cellular phone 110 communicates with a cellular network 130, which in turn communicates with an Internet network 140 (Internet). The system 100 also includes a post-processing server 150 associated with the service provided by the system 100 and which is intended to receive over the Internet 140 the pre-selected information (e.g., professional information) that is transmitted by the cellular phone 110. The post-processing server 150 converts the received information into a more desirable format and then transmits the results over the Internet 140 to a user's mail server 160. Alternatively or in combination with transmitting the results to the mail server 160, the results can be sent via facsimile to the user or stored on a computer associated with the illustrated system 100. For example, a user's computer 170 (which may be the same as cellular phone 110) can access the pre-selected information (professional information) via Internet 140 as known in the art. Servers and others technologies known in the art are not limited to specific embodiments and may include various known and subsequently developed implementation. For example, a server may have distributed or other suitable architecture understood by a person skilled in the art.

FIG. 2 is a flow chart showing one aspect of how the system 100 operates according to one exemplary embodiment with respect to capturing and then processing the pre-selected information. For the purpose of illustration only, the pre-selected information will be discussed herein as being professional information, as described in greater detail below; however, it will be understood that the pre-selected information is not limited to being professional information as described below but instead can be any type of information that the user wishes to capture and process in the manner described herein.

At a step 200, the professional information is captured in the form of a digital image using the camera 120 of the cellular phone 110. For example, when the professional information is in the form of some type of text or an image or some other type of indicia, the information can be captured by focusing the camera 120 on the object and then initiating the capture of the information as by pressing a button or the like on the cellular phone 110. At step 210, the captured professional information is preferably and appropriately pre-processed and preferably compressed. At step 220, the captured professional information is sent to the post-processor server 150 (FIG. 1) using any number of different communication protocols. For example, the captured professional information can be transmitted to the post-processor server 150 as an attachment to an e-mail using communication protocol and conventional techniques. The post-processor server 150 converts the received professional information into a desired format consistent with such information as indicated at step 230. Then the processed information is transmitted at step 240 to the user via any number of different communication techniques, including transmitting the processed information via an e-mail or the processed information can be delivered to the user as a facsimile or the processed information can be stored internally. The properly formatted professional information is then available to the user in a personal email account or otherwise as mentioned above.

Preferably, the user interface (e.g., a key pad or the like 112 of FIG. 1) of the cellular phone 110 includes a selection or means for enabling capturing of professional information. This can be in the form of a button as part of the interface 112 or the like on the user interface of the phone 110. When this means 112 is selected, a user is provided with a menu 260 as depicted in FIG. 3A. As will be understood, the menu 260 is displayed on a display associated with the handheld device (cellular phone 110). The menu 260 is a scrollable menu that identifies different types of pre-selected information, in this case business information, that can be captured by the user. For the purpose of illustration, the menu 260 includes the following entries or categories, all of which are different types of business information that can be captured and processed by the user. The menu 260 includes entries for (a) a business card 262; (b) a receipt 264; (c) a text document 266; (d) notes 268, e.g. handwritten text and pictures; (e) notes in user's handwriting 270; (f) whiteboards 272; (g) forms 274; and (h) any unspecified images 276. The menu 260 may contain a subset of the above information or it may identify other information and therefore, the above entries are merely exemplary in nature. Also a default setting may be pre-selected and incorporated into the operating software. Of course, the default setting can be changed by the user. Based on the type of the professional information selected by the user, the cellular phone 110 performs adjustments for more efficient capture and pre-processing of professional information. In other words, if the user selects business card 262 on the menu 260, the processor of the cellular phone 110 can provide the camera 120 with specific imaging commands or the like in order to make any adjustments that may result in a better quality image being captured. Accordingly, the optimal conditions for the camera 120 when capturing the image of a business card 262 may be different than the optimal conditions for capturing an image of the user's handwritten notes 270 (which might require a finer resolution to pick up fine details) in order for all the handwriting to be legible and permit it to be more accurately processed.

Figure 3B:
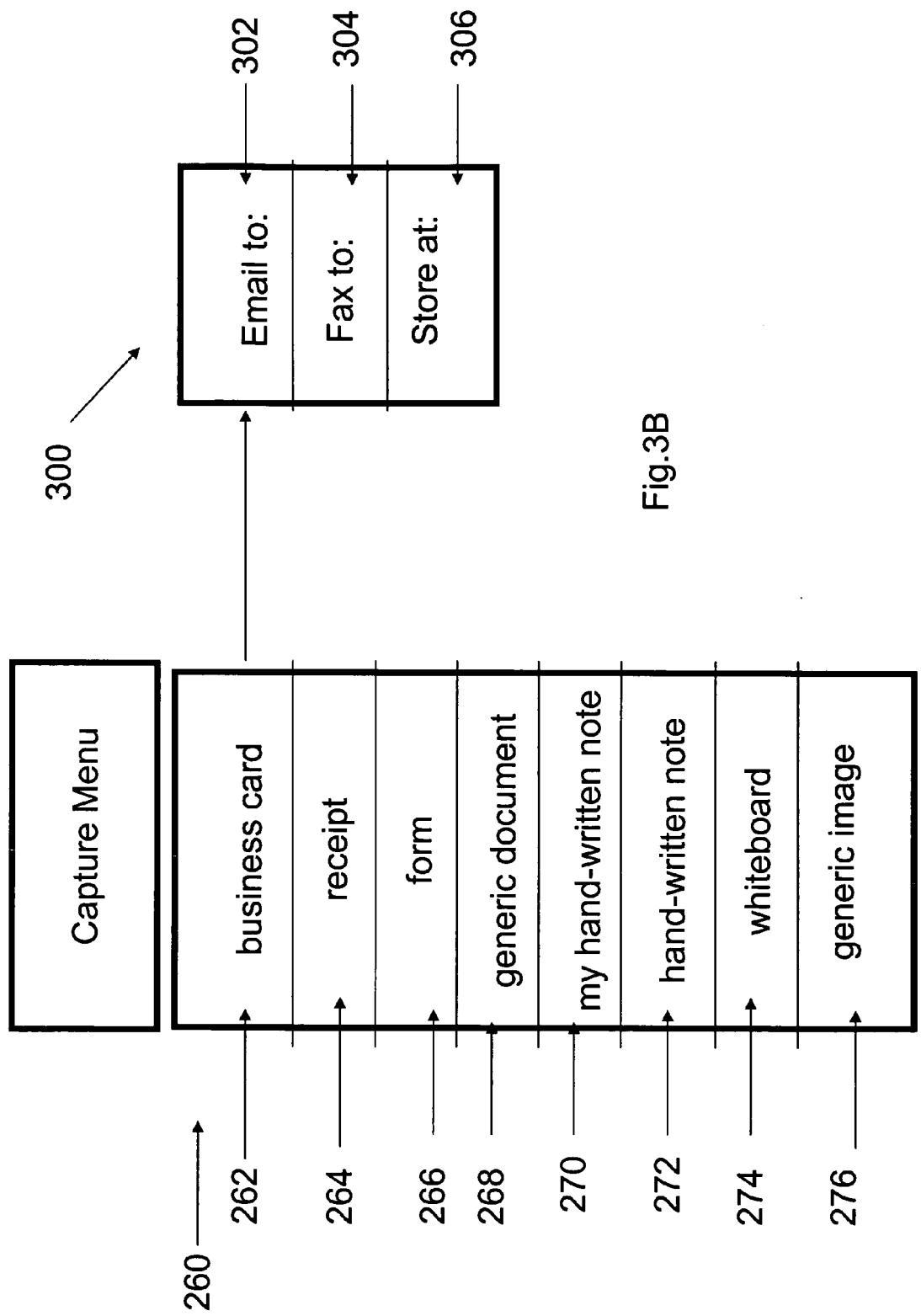
FIG. 3B is a schematic diagram of a submenu of the user interface menu of FIG. 1.

Preferably, the user is provided with an additional submenu 300 as depicted in FIG. 3B, so that the user has an option to specify where to send or how to store the above-mentioned professional information that has been selected and captured by the user. For example, each of the menu entries 262-276 can include a submenu 300, with the submenu 300 being either the same for the menu entries 262-276 or different. The submenu 300 can be accessed using standard menu protocol, such as highlighting the selected information and then clicking a button or using a mouse type tool to navigate the submenu 300. In the example shown in FIG. 3B, submenu 300 includes an e-mail delivery option (icon or entry 302); a facsimile delivery option (icon or entry 304); and a stored at option (icon or entry 304). Once again, a default setting may be pre-selected as part of the submenu 300. For example, the default can be that the selected and captured professional information is to be delivered as an attachment file to an e-mail.

In one embodiment, the professional information can be completely processed at the post-processing server 150 (FIG. 1) as shown in the process flow chart of FIG. 4. At step 310, the user selects the option of capturing professional information (pre-selected information) and at step 320, the user selects the type of professional information that is to be captured and processed, using a menu, e.g., menu 260 of FIG. 3a. Based on the selected document type (e.g., business card 262) and its destination, as selected in the submenu 300, the system 100 generates and stores the corresponding capture flag (CF). Subsequently the camera 120 settings are adjusted based on the CF value for more optimal capturing conditions as set forth in step 330.

Specifically for business cards, receipts, documents, forms and notes, the capture operation proceeds as follows. The camera 120 exposure time is set to a shorter duration than for ordinary pictures and the flash is turned off. Preferably, the exposure time is roughly one half of the focal length. So for a 35 mm lens, the exposure time is preferably 1/70th of a second or less. But the exposure time is also bounded by image noise. For example, it is preferred to set the camera ISO to 400 with acceptable noise level and use a 1/100th of a second exposure time. Such a setting would produce more noise than with a usual camera setting, but post-processing can provide some noise cleanup and an OCR is not very sensitive to this noise, which is primarily CCD noise.

For white boards, the exposure settings are left unchanged and the flash is on. Also it should be noted that a white board is optionally captured with a series of photographs or digital images. Accordingly, if the capture flag (CF) identifies a white board selection, the user continues taking/capturing images in the document capture mode until the user enters an 'escape' or a similar command that ends the document capture mode and the capturing of the images. The user interface of the cellular phone 110 can also include an option to specify the order in which the pictures of a whiteboard are to be taken (for example: left to right, top to bottom, etc.).

The image of the document is then captured (photographed) at step 340 and the user is provided with the visual image as presently done for captured cellular phone images/photographs as indicated at step 350. In other words, the captured image is displayed on the screen that forms a part of the cellular phone 110 and if the user is dissatisfied with the resultant image, the user can simply return to the capture image step 340 and the process is repeated until the user is satisfied with the quality of the captured image. This can be done by simply incorporating a series of pop-up windows or menus or the like as part of the software to ask the user if the user is satisfied with the quality of the captured image and wishes to continue the process. For example, a window with a "yes" box and a "no" box can be displayed and the user can toggle between or otherwise highlight one of these boxes to indicate whether to repeat the image capturing process or to continue to the next step.

If the user is satisfied with the quality of the captured image, then the next step, indicated at 350, is that the captured image is sent to the post-processing server 150 (FIG. 1) in an appropriate form, such as an e-mail message that can include an ordinary e-mail text generated on the cellular phone 110 as well. The capture flag (CF) identifying the type and disposition of the document is included in the e-mail message as well. The image can be sent from the post-processing server 150 to other interfaces (e.g., a facsimile machine, etc.) as well.

It should also be noted that one user who has a cellular phone 110 which has no access to the various components of the present system 100 can instead send the captured image over a wireless connection to a cellular phone 110 of a user who has access to the system 100 and the service provided thereby. Then, this image is processed as specified herein except the step 340 of capturing the image with the camera 120 is omitted. In essence in such a use, the image capturing has previously been done by a different use and the current user merely is provided with the captured image by receiving the captured image by means of the mobile handheld device (cellular phone 110) through a wireless interface.

Figure 5:
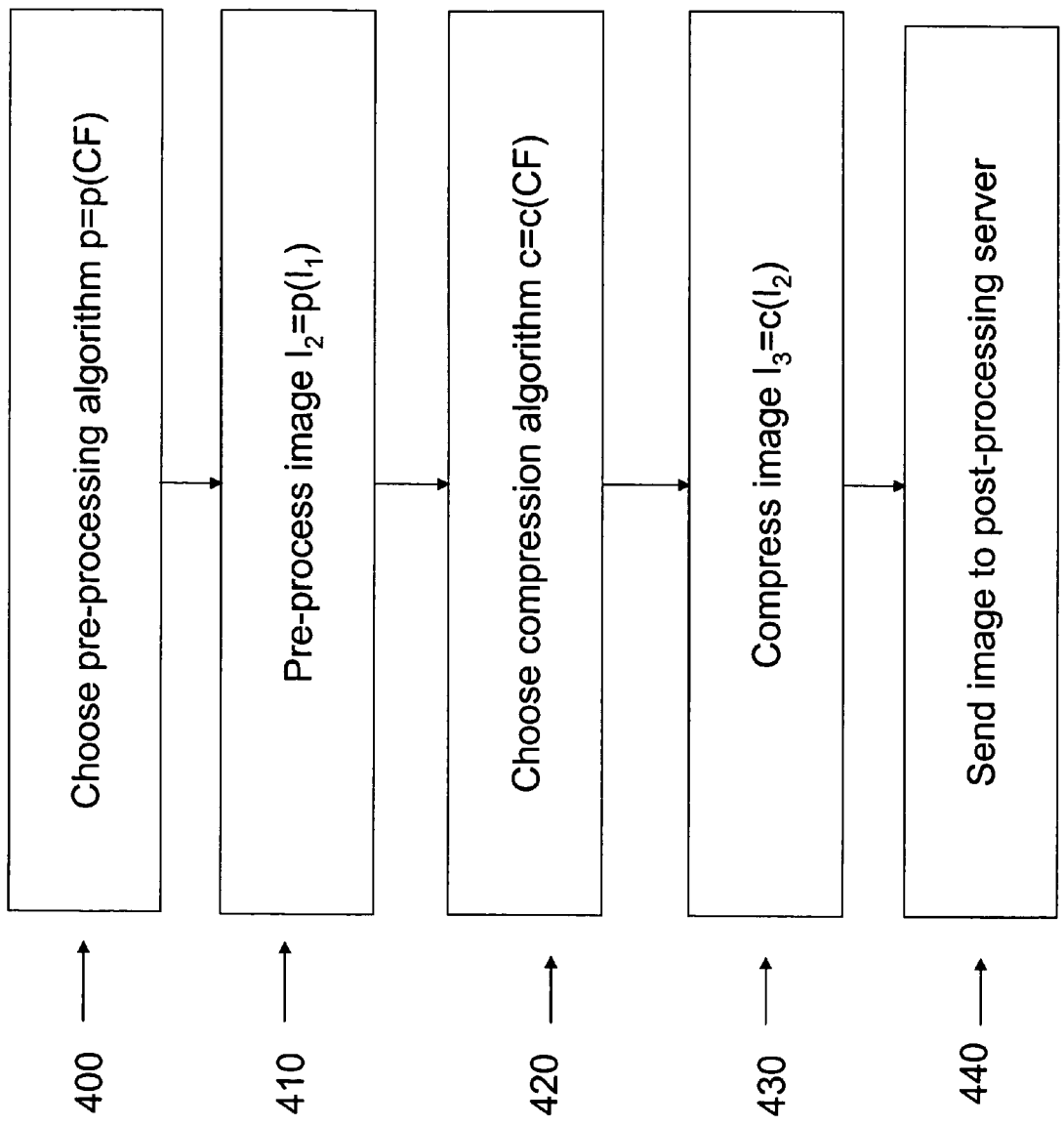
FIG. 5 is a flow chart illustrating a process flow of software components, according to a different exemplary embodiment, that are associated a handheld device that is itself associated with the system of FIG. 1 and supports a service provided thereby.

In another embodiment, illustrated in FIG. 5, cellular phone software provides camera settings adjustment, image pre-processing and image compression based on the document type. In this embodiment, the initial steps, namely steps 310, 320, and 330 of FIG. 4, are the same as in the previous embodiment described with reference to FIG. 4.

After the camera setting has been completed, several or more (e.g., three) images/pictures of the document or imaged object are taken. Then the resultant captured images are pre-processed in accordance with the CF flag as depicted in FIG. 5. Specifically at steps 400 and 410, images of business cards, business forms, notes, and/or receipts are pre-processed using the following steps. First in each of the three captured images the document is identified and tagged. The surrounding fields are removed and the segmentation step (background, foreground) is performed using known techniques. Subsequently the image with the least motion blur is selected using imaging techniques known in the art. In the selected image, a deskew operation is performed, as known in the art, so as to orient the image to be substantially parallel to the boundaries of the frame. Next, the image is corrected by removal of barrel distortion using known techniques. Notably, the deskew operation is performed for whiteboards but there is no need to remove barrel distortion. Finally, the noise is removed from the image of any available type. The level of noise is recorded so that if the user is dissatisfied with the quality of the image may adjust the capture settings accordingly. Image processing steps referred to in connection with image pre-processing are known in the art, see, e.g., "Digital Image Processing" 3$^{rd}$ edition by William K Pratt, which is incorporated herein by reference in its entirety, and therefore these steps are not described in any great detail herein.

The selected captured image has now been pre-processed and control is transferred to compression software as generally indicated in steps 420 and 430. During compression, first, the captured image of a business card, receipt, generic text document, or business form is converted into only gray scale data. That is, all color information has been disregarded using known techniques. Then, the captured image is compressed using a compression algorithm suitable for printed text (see, for example, "Lossless JBIG2 Coding Performance", Proc. Data Compression Conference, IEEE Computer Society Press, 553.), which is incorporated herein by reference in its entirety.

The compression steps 420, 430 for an image of a note are similar to the steps described above except that the compression algorithm is optimized for hand-written text (for example, see commercially available software developed by Charactell Ltd). The compression algorithm for user hand written notes can be trained for a specific user as known in the art. The white boards and generic images can be compressed with generic JPEG algorithm. Finally, the compressed image with a capture flag value is sent to the post-processing server 150 via a variety of conventional interfaces.

In yet another embodiment, the system may include cellular phones 110 with different capabilities, so that some cellular phones 110 are not able to perform some or all steps necessary for proper pre-processing and/or compression of the captured image. In this case, the capture flag (CF) can have additional fields to identify hardware and/or software versions of the user's cellular phone 110. Consequently, the post-processing can be adjusted for a particular input cellular phone 110, since the server receives information about the pre-processing and compression (if any) performed at the phone 110.

Figure 6:
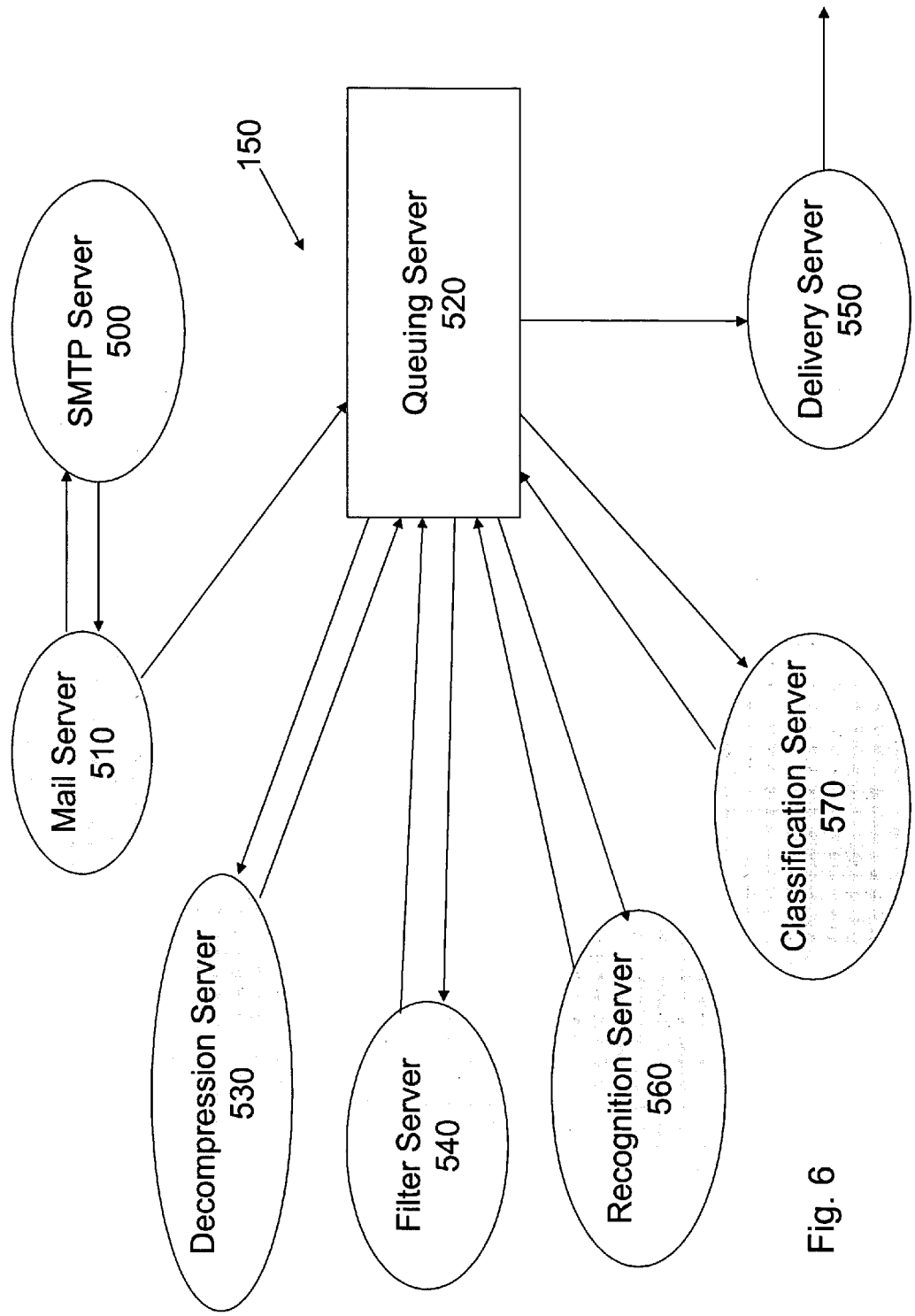
FIG. 6 is a schematic diagram illustrating components of a post-processing server of the system according to one exemplary embodiment.

The post-processing server portion 150 of the system 100 is schematically illustrated in FIG. 6. It can be implemented as one or several systems using conventional server technology that is known in the art. Software modules illustrated as circles in FIG. 6 can be implemented using known techniques depending on the operating system and the specific architecture that is chosen for the server. Each software module is referred to as a "Server" and is illustrated in FIG. 6 as such because it performs a distinct step in processing and can be segregated as a separate system. Each software module referred to as a Server may be a process or a collection of processes communicating using an inter-process communication mechanism of an operating system of a given computer. Depending on the chosen architecture, the post-processing server software may also reside in several physical computers communicating over a network. In short, the software-hardware architecture of the post-processing server 150 may be implemented in a variety of way as understood by a person skilled in the art.

As noted previously, the message from the cellular phone 110 is provided to the server system preferably over the cellular and Internet networks 130, 140. (Also, it may be delivered using a fax protocol or another known technique.). For example, the message can be sent to the e-mail address of the service provider. The message consists of a text message inserted by the user, an image of the document processed and compressed at the telephone as described above, and a CF flag identifying the type of the document and, preferably, capabilities of the telephone and the mode of delivery of the information to the user. The message also preferably includes information identifying the user (e.g. the Internet identification of the telephone of the user or another unique identification of the user), other information that may be useful for the disclosed service (e.g., identification of a communication service provider), as well as any other information customarily include in e-mail messages.

The transmitted message is received at SMTP server 500. The SMTP server 500 is typically a conventional e-mail server that receives, stores, retrieves and sends messages received via Internet 140. A software module 510 (Mail Server) polls the SMTP server 500 waiting for a new e-mail to arrive. Polling can be done at pre-determined intervals selected based on the system traffic and its processing capability as understood by a person skilled in the art. For example, polling may be every five minutes. It can also be adjusted based on the traffic statistics or it can be dynamically adjusted. The software module/software 510 identifies and downloads new e-mails (messages) received during the polling interval. The software 510 maintains a database conventionally constructed for storing such message with image attachments.

In addition, the mail server 510 validates the received e-mail and user information provided therein. Relevant information is extracted from the e-mail. This information includes the enclosed image, CF flag, and a user identifier (ID), e.g. e-mail address, phone number, or another conventional identifier. If any of the required information is missing, such e-mail is discarded and a message indicating an error is returned to the sender, if possible. In some embodiments, the e-mail is automatically resent by the telephone in response to an error message.

Next the received user identifier is validated. A user of the system 100 preferably maintains an account with the provider of system 100 and the post-processing server 150 stores account information conventionally associated with on-line services. Such account information may, for example, include user's contact and payment information as well user's preferences.

If user has been authenticated as a valid user of the system 100 and is in good standing, the processing continues as described herein. Otherwise, a message indicating an invalid user is returned, the received information is deleted, and processing in connection with such invalid user terminates.

For a valid user and a properly validated message, an entry is made in the shared database of the service associated with system 100. The entry is indexed by the current date and time and it includes text of the message, CF flag, the image, information about the user, and any other information useful for further processing that may have been supplied with the e-mail. Then a message is identified to software 520 with its shared database entry. Software 520 coordinates the processing of the received information and is referred to as queuing server 520. It includes a queuing database that identifies each submission under processing and scheduling software for invoking the proper software modules in the proper sequence. Software, such as the queuing server 520, is known in the art, see, e.g. "Object-Oriented Client/Server Internet Environments" by Amjad Umar, January 1997, Prentice Hall Press, which is hereby incorporated by reference in its entirety.

Other software modules of the system may poll the corresponding queue in the software 520 and retrieve messages ready for the corresponding step of processing. It performs ordered scheduling of processing and tracks the proper sequence of required operations as known in the art. If it receives an error indication resulting from one of the operations, it typically terminates the processing of a given message, returns the identification of the error to the user and to the system administrator and terminates the processing sequence of a given message, including a conventional clean up sequence for discarded information.

When the scheduling sequence reaches a given message, software 520 provides the information of the next message database entry to be processed to a software module which is next in the processing sequence or a given message. After a software module completes its operation, it stores the processed information in the database entry created for a given message and it signals to the queuing server 520 that a given step of processing has been successfully completed. (As noted, in the event of unsuccessful completion, the processing terminates). After a successfully-completed operation, the identifier of the message is queued awaiting the availability of the next operation. When next software module becomes available the queuing server 520 provides identification of the message to be processed including the identification of the location of the results of the previous stage of processing. Hereinafter, the processing sequence for one message is described, but it should be noted that multiple messages are scheduled as discussed above. Also, unless indicated to the contrary, for each processing step the informational output is stored centrally and then retrieved by the software module scheduled for the next step by the queuing server 520.

First queuing server 520 makes the message information available to a software module 530 referred to as Decompression Server 530. As noted, the image provided by the cellular phone 110 has been compressed so as to save the transmission bandwidth. An identification of such a conventional compression technique is done based on the CF value. The decompression software 530 performs a corresponding decompression operation, stores the results, and signals to the Queuing Server 520 that a given message has been successfully decompressed, or conversely that an error has occurred. In the embodiments that do not employ compression at the cellular phone 110, this operation is omitted.

This step is also omitted if the CF value indicates that the image was captured on a cellular phone 110 without a compression capability or if the image contains business information that does not require compression on the cellular phone 110.

Then, the message identification is provided from the queuing server 520 to a filter server software module 540. An exception is a generic image, which requires no further processing and therefore it is provided to a delivery server software module 550. It has been described in connection with the telephone operation (see FIG. 5 and accompanying discussion) that in some embodiments the image is processed before it is compressed and sent. In some embodiments, to simplify the telephone software architecture, the filter server 540 performs such a processing or a portion thereof. In addition, the image, even if already pre-processed at the telephone, is further enhanced using different techniques so that several differently filtered images (versions of the same original image) are obtained. The image enhancement processing steps in the filter server 540 depends on the value of the capture flag CF, which encodes the level of processing performed at the telephone and the preferred post-processing algorithm.

For example, business cards, receipt, generic documents and hand written notes captured on the cellular phone 110 without a pre-processing capability can be processed in the following steps:

1. Convert the captured image to an 8-bit grayscale image;
2. Apply a segmentation algorithm, such as the Otsu method, known in the art, to separate bright areas from the dark background of the image;
3. Apply multiple erosion-dilation filters to remove pepper noise and to smooth outside edges of the document;
4. Find black border areas and forming a board masking image; and
5. Masking the image so as to obtain an image comprising essentially only the relevant.

The business cards, receipts, generic documents and hand written notes captured on a cellular phone 110 with pre-processing capabilities can be processed in following steps:
1. Correct shadow and lightness gradients;
2. Perform background, foreground segmentation; and
3. Perform background noise removal.

For white board images the processing can employ the following steps regardless whether the phone has a pre-processing capability:
1. Correct shadow and lightness gradients;
2. Perform background, foreground segmentation;
3. Detect the contrast of the background;
4. Smooth the signal in the vicinity of the average background level; and
5. Suppress the saturation in the pixels that are in the vicinity of the white background.

Each individual step above is known in the art, see e.g. the William K Pratt reference cited above and incorporated by reference in its entirety.

The filtering is performed a number of times on each image so that when the operation is completed, the output is several filtered images, as well as the originally-received image. This information is stored centrally and control returns to the queuing server 520.

Next the images are processed at a software module 560 referred to as recognition server 560, except for generic images and white boards. Generic images and white boards require no further processing and therefore they are provide to the delivery server software module 550. Further if a user specified a fax delivery, for all the documents control is transferred to the delivery server software module 550, since no further processing is needed. Also only one resultant image for a document should be retained at this stage in the event of a fax delivery.

As with other software modular it polls the queuing server 520 periodically and monitors for the new data. For each new message, it performs an operation consistent with the CF flag. It copies the filtered data and performs either an OCR or an ICR operation for each of multiple images produced by the previous step of filtering. For printed text images, such as business cards, receipts, and text documents the operation is OCR, which is performed using known OCR techniques. For hand-written images, the operation is ICR, which is also known in the art. For the forms a combination of these techniques may be employed. Notably for hand-writing recognition, user-specific data preferably should be stored in the system in connection with the user account. For the users that maintain this information with the service, it is retrieved and provided to software (recognition server) 560.

For several types of documents the processing is terminated at the recognition server 560. In some embodiments, for generic text documents, user hand written documents, and forms no further processing is necessary. For such documents, the system 100 examines a metric indicating the quality of the OCR or ICR results and discards all the duplicate results except for the one of the highest quality, which is then stored in the shared database. For business cards and receipts, multiple OCR outputs are still retained for subsequent processing. Control then returns to the queuing server 520 for this message. The queuing server 520 checks the CF flag and determines whether a given document type requires additional processing. Based on this document classification, the control is passed to either the delivery server software module 550 or a classification server software 570.

For example, for business cards, forms and receipts, the classification server is the next step in the operation of the system for a received message. The classification server 570 analyzes the recognition server 560 results so as to interpret the printed information, for example, by isolating the person and company names, telephone number, and e-mail address for a business card, or the name of an establishment and amount paid for a receipt. The interpretation is performed for all the duplicate versions. The resultant interpreted information is organized in the fields corresponding to the meaning of the interpreted data as well as a metric indicating the quality of the interpretation process. Thereafter, only the record with the highest quality result is retained and stored in the shared database.

Figure 7:
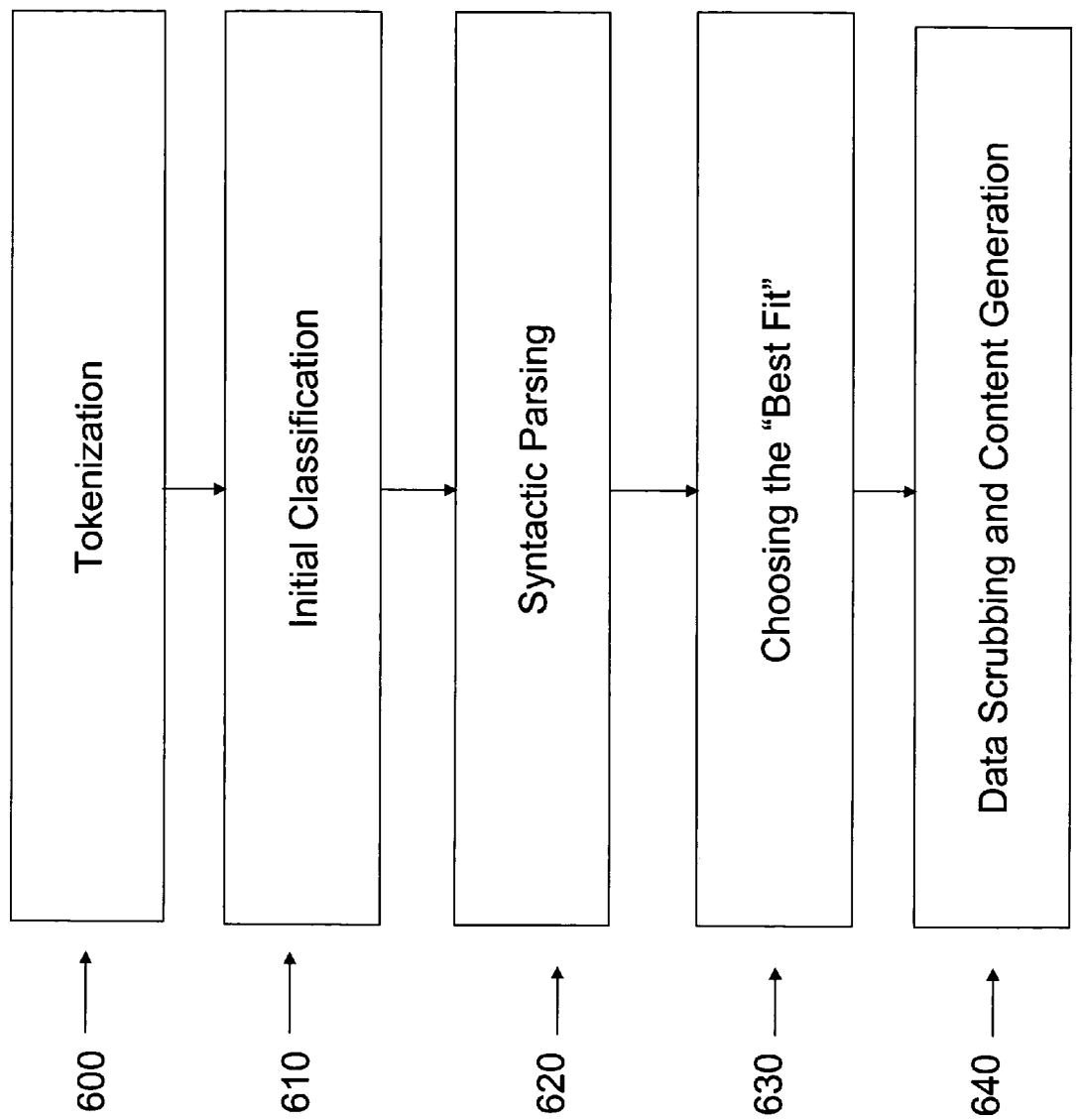
FIG. 7 is a flow chart illustrating a process flow of classification software which is part of the post-processing server of FIG. 6.

The processing flow in the classification server 570 is a pipeline shown in FIG. 7. This pipeline consists of a number of phases or steps, each of which has its own inputs and outputs. It should be noted that the processing flow as illustrated in FIG. 7 comprises steps that are known in the art of natural language recognition and grammar, see e.g., "Natural Language Understanding" by James Allen, 1995, Benjamin-Cummings Publishing Co., Inc. and "Compilers" by Alfred V. Aho, Ravi Sethi, Jeffrey D. Ullman, 1985, Addison-Wesley Longman, Inc, both of which are hereby incorporated by reference in their entireties.

More specifically, for business cards, the phases in the pipeline are as discussed below. Step 600 is a tokenization step. This phase or step 600 takes OCR characters as input and generates a set of tokenizations as output. A token is a set of characters that can be manipulated as a single entity. The tokenizations represent all the possible combinations of tokens using all reasonable character alternates that were determined by the OCR engine.

Step 610 is an initial classification step. At this phase or step 610, the classification pipeline takes a set of tokenizations as input and generates a tagged set of tokenizations as output. The tags are possible interpretations of tokens, such as name prefix, city, state, part of web address. Various heuristics can be applied to the tokens to determine what tokens can represent. Each token at this stage may have a number of tags. The tags may be assigned, for example, by dictionary look ups, identification postal zip codes and telephone numbers, look-up of position specific identifiers and other relevant filtering.

Step 620 is a syntactic parsing step. This phase or step 620 takes the tokenizations generated in the initial classification phase, where each token may potentially have a number of tags, and generates an output where each token only has a single tag. The tags are removed by applying syntactic grammar rules to the tokens and looking for streams that make sense.

Step 630 is a step of choosing the "best" fit. This phase takes each of the parsing outputs and picks out the "best" one. In this phase or step 630, the syntactically-parsed tokens provided by the previous phase are converted into the desired items (e.g., Name, Address, Company, Job Title, Work Phone, Mobile Phone).

Step 640 is data scrubbing and content generation. At this phase the output is further verified and some of the errors may be corrected using known data scrubbing techniques. For example, case of lettering can be adjusted, erroneous strings can be deleted, names and addresses can be standardized, and spelling errors can be corrected. After the scrubbing, a template is used based on user's preference to generate the output in the desired format.

During the processing at the classification server 570, grammar, dictionaries and other relevant rules are chosen based on the value of the CF flag (for example to distinguish business cards from receipts). For receipts the grammar and dictionaries are different but the sequence of steps is the same as discussed above and not repeated here.

The final step of the processing on the server is provided by software 550 referred to as the delivery server 550. It is responsible for packaging the resultant information and sending it to the e-mail account of the user, which is stored in the user database in connection with the user account of the service. The message to the user includes the processed document as discussed above as well the original text message (inserted by the user). If a user selects to store this information on the post-processing server 150, then it is stored in connection with the user account. A user has a capability to log on to the server and retrieve this stored information. Also, as previously noted, a user may receive a fax output from the disclosed service. The fax number may be stored in connection with the user account or a different number may be provided from the telephone as a part of the set up process. As noted in FIG. 4, the fax number can be entered at the user interface. If entered, this number becomes part of the CF flag, and it overrides that default number stored for the user. If a fax option is selected, the delivery server 550 sends the result of the processing by fax as known in the art.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the appended claims. Doubtless numerous other embodiments can be conceived that would not depart from the teaching of the present invention whose scope is defined by the following claims.

The invention claimed is:

1. A method of capturing information using a mobile handheld device with a camera comprising the steps of:
   providing a user with a capability to select a type of professional information to be captured;
   capturing information identified by the user, wherein software associated with the mobile handheld device adjusts the step of capturing information for the selected type of professional information;
   pre-processing information so as to obtain pre-processed information utilizing software, wherein the step of pre-processing the information is adjusted for the selected type of professional information; and
   providing the pre-processed information to a server for post-processing in a message that includes data identifying the type of professional information.

2. The method of claim 1, wherein the type of professional information is selected from the group consisting of a business card, a receipt, a form, a printed document, handwritten information, a whiteboard, and graphic indicia.

3. The method of claim 1, wherein the step of pre-processing the information further includes the step of:
   removing background information from the captured information.

4. The method of claim 1, wherein the handheld device includes a flash and the step of capturing the information includes the step of adjusting the flash based on the type of professional information to be captured.

5. The method of claim 1, further comprising the step of:
   receiving confirmation from a user that the capture of the information was successful.

6. The method of claim 1, further comprising the step of:
   capturing successive images to so as to capture a whiteboard.

7. The method of claim 1, wherein the handheld device is a cellular telephone.

8. The method of claim 1, further comprising the step of:
   compressing the pre-processed information and wherein the pre-processed information provided to the server for post-processing is previously compressed.

9. The method of claim 8, wherein the step of compressing is adjusted for the selected type of professional information.

10. The method of claim 1, wherein the message in the step of providing the pre-processed information to a server further includes information identifying capabilities of the handheld device.

11. The method of claim 1, wherein the handheld device is a cellular phone with a camera and wireless Internet capabilities.

12. The method of claim 1, wherein the step of capturing the information includes the step of taking a photograph with the camera.

13. The method of claim 1, wherein the step of capturing information includes the step of receiving an image from another device over a wireless connection with the other device.

14. A method of processing information comprising the steps of:
   receiving from a mobile handheld device that includes a camera a message including data representing an image of a document and an identifier of a type of the document;
   storing the data and the associated identifier;
   performing image enhancement based on the identifier so as to obtain an enhanced image;
   recognizing information in the enhanced image so as to obtain data representing the image in a non-image format, wherein a recognition technique is determined in accordance with the identifier;
   for specific documents, analyzing at least some of the data representing the image in a non-image format so as to obtain the meaning of information in said data and storing portions of the data in accordance with the meaning;
   creating an output message including the result of one of the step of recognizing and the step of analyzing depending on the value of the identifier having information formatted in accordance with the identifier; and
   providing said message to a user.

15. The method of claim 14, wherein said data in the step of receiving the message was obtained by performing the steps comprising selecting the type of data and storing the identifier of the type, adjusting the camera according to the identifier, and pre-processing the data based on the identifier.

16. The method of claim 14, wherein in the data received at the step of receiving the message is previously compressed and further including the step of decompressing compressed data according to the value of the identifier.

17. The method of claim 14, wherein the step of recognizing the information includes the step of performing a character recognition operation on the information.

18. The method of claim 14, wherein the step of recognizing comprises the information includes the step of performing written text recognition on the information.

19. The method of claim 14, wherein the step of analyzing at least some of the data includes the steps of tokenization, initial classification, syntactic parsing, and choosing a best fit.

20. The method of claim 14, wherein the step of analyzing at least some of the data includes using a dictionary and grammar rules selected on the basis of the identifier.

21. The method of claim 14, wherein the step of performing image enhancement includes the step of correcting shadow lightness gradients.

22. The method of claim 14, wherein the step of performing image enhancement includes the step of removing background noise.

23. The method of claim 14, wherein the step of performing image enhancement includes image segmentation.

24. The method of claim 14, wherein the handheld device is a cellular telephone.

25. The method of claim 14, wherein the received message includes data representing capabilities of the handheld device.

26. The method of claim 14, wherein the received message includes data representing the mode of delivery of the output message to the user.

27. The method of claim 14, wherein the step of providing the message to a user includes the step of sending an e-mail to the user.

28. The method of claim 14, wherein the step of providing said message to a user comprises the step of sending a fax to the user.

29. A mobile handheld device for capturing information comprising:
   a camera;
   a flash;
   user interface software including software for providing a user with a capability to select a type of professional information to be captured by the handheld device;
   software for adjusting a capture of the information identified by a user on the basis of the type of professional information selected by the user;
   means for pre-processing information so as to obtain pre-processed information utilizing software, wherein the means for pre-processing makes adjustments based on the selected type of professional information; and
   means for providing the pre-processed information to a server for post-processing, the pre-processed information being in the form of a message that includes data identifying the type of professional information.

30. The device of claim 29, wherein the message includes data identifying capabilities of the mobile handheld device.

31. A network system for capturing and processing information comprising:
   a mobile handheld device that includes a camera and a user interface that is configured to permit a user to select the type of professional information that is to be captured from a menu; the camera being adapted to capture information of the selected type of professional information, the handheld device including software that is configured to pre-process the captured information based on the selected type of professional information and optionally compress the captured information, wherein the software associated with the handheld device is configured to adjust how the information identified by the user is captured on the basis of the type of professional information selected by the user;
   a network including one or more servers including a post-processing server that is in communication with the handheld device such that the pre-processed information is transmitted to the post-processing server which is configured to convert the pre-processed information into post-processed information having a predetermined format; and
   means for transmitting the post-processed information in the predetermined format to the user.

32. The system of claim 31, wherein the mobile handheld device comprises a cellular phone and the professional information comprises business related information with the menu listing the different types of business related information that can be captured as a digital image using the camera.

33. The system of claim 32, wherein the business related information that is listed as entries on the menu includes a business card, a receipt, a form, a printed document, handwritten information, a whiteboard, and graphic indicia.

34. The system of claim 32, further including a submenu for each entry in the menu providing the user with options for at least one of sending the business related information and storing the business related information.

35. The system of claim 32, wherein the predetermined format is in the form of an email that is delivered to a mail server that is associated with the user.

* * * * *